United States Patent
Ferber et al.

(10) Patent No.: US 7,382,683 B1
(45) Date of Patent: Jun. 3, 2008

(54) COMPUTING AN ABSORPTION PARAMETER FOR A MODE-CONVERTED SEISMIC WAVE

(75) Inventors: Ralf Ferber, Horsham (GB); Stephen Morice, New Plymouth (NZ)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/638,861

(22) Filed: Dec. 14, 2006

(51) Int. Cl.
*G01V 1/26* (2006.01)
(52) U.S. Cl. ...................................... 367/30
(58) Field of Classification Search ............... 367/30
See application file for complete search history.

(56) References Cited

U.S. PATENT DOCUMENTS

| | | | |
|---|---|---|---|
| 4,213,194 A * | 7/1980 | Spurlock et al. .............. | 367/14 |
| 6,564,899 B1 * | 5/2003 | Arian et al. ................ | 181/102 |
| 6,917,564 B2 * | 7/2005 | Leaney ........................ | 367/73 |
| 6,937,938 B2 * | 8/2005 | Sansone ...................... | 702/16 |
| 2002/0010549 A1 * | 1/2002 | Vinje ............................ | 702/14 |
| 2006/0092764 A1 * | 5/2006 | Robertsson et al. .......... | 367/14 |
| 2006/0265132 A1 * | 11/2006 | Rickett ........................ | 702/14 |

FOREIGN PATENT DOCUMENTS

WO    WO 2006/025824 A1    3/2006

OTHER PUBLICATIONS

Purnell, Guy. Imaging beneath a high-velocity layer using converted waves. Geophysics. vol. 57. No. 11 (Nov. 1992). p. 1444-1452.*
Feustel, A.J. Seismic Attenuation in Underground Mines: A comparative evaluation of methods and results. Tectnophysics 289 (1998) 31-49.*
Futterman, "Disperive body waves," *J. Geophy. Res.*, 67(13):5279-5291, 1962.
Hale, "Q-Adaptive deconvolution," SEG Technical Program Expanded Abstracts, pp. 82-82, 1982.
Hargreaves and Calvert, "Inverse Q filtering by Fourier transform," *Geophysics*, 56(4):519-527, 1991.
Robinson, "A technique for the continuous representation of dispersion in seismic data," *Geophysics*, 44(8):1345-1351, 1979.
Varela, Rosa and Ulrych, "Modeling of attenuation and dispersion," *Geophysics*, 58(8): 1167-1173, 1993.

* cited by examiner

*Primary Examiner*—Deandra M Hughes
(74) *Attorney, Agent, or Firm*—Dan C. Hu; Liangang (Mark) Ye; Jeffrey E. Griffin (57) ABSTRACT

To survey a subterranean structure, measured seismic data is processed using an algorithm for deriving a single-mode absorption parameter. A first absorption parameter for a mode-converted seismic wave is computed based on an output of the algorithm. The first absorption parameter represents an absorption effect of the mode-converted seismic wave by the subterranean structure, where the mode-converted seismic wave is reflected from the subterranean structure in response to a source seismic wave of a different mode than the mode-converted seismic wave.

17 Claims, 5 Drawing Sheets

COMPUTING AN ABSORPTION PARAMETER FOR A MODE-CONVERTED SEISMIC WAVE

TECHNICAL FIELD

The invention relates computing an absorption parameter for a mode-converted seismic wave, where the mode-converted seismic wave is reflected from a subterranean structure in response to a source seismic wave of a different mode than the mode-converted seismic wave.

BACKGROUND

Seismic surveying is used for identifying subterranean elements, such as hydrocarbons, fresh water, and so forth. In performing seismic surveying, seismic sources are placed at various locations on an earth surface or sea floor (or in a wellbore), with the seismic sources activated to generate seismic waves directed into a subterranean structure. Examples of seismic sources include explosives, air guns, or other sources that generate seismic (acoustic) waves. In a marine environment, seismic sources and sensors can be towed in water by a sea vessel.

The seismic waves generated by a seismic source travel into the subterranean structure, with a portion of the seismic waves reflected back to the surface (earth surface, sea floor, or wellbore surface) for receipt by seismic sensors (e.g., geophones). These seismic sensors produce signals that represent detected seismic waves. Signals from the seismic sensors are processed to yield information about the content and characteristic of the subterranean structure.

As seismic waves travel through an earth formation, the seismic waves are subject to dissipation due to conversion of the energy of the seismic waves into heat by the earth formation. A seismic wave typically has multiple frequencies. The dissipation effect varies at different frequencies, with higher dissipation occurring at higher frequencies of the seismic wave. As a result, the seismic waves lose more amplitude at higher frequencies than at lower frequencies.

Conventionally, when processing measured seismic data, an inverse filtering technique is applied to correct the dissipation (absorption) effects. Typically, the inverse filter increases amplitudes of seismic waves at higher frequencies to counter the dissipation effect.

There are two types of seismic waves: P-wave (also referred to as a compression wave, which extends in the direction of propagation of the seismic wave); and S-wave (also referred to as a shear wave that extends in a direction generally perpendicular to the direction of propagation of the seismic wave). The dissipation (absorption) effect of a seismic wave is represented by an absorption parameter Q, also referred to as a seismic quality factor. Conventional techniques for estimating absorption parameters typically compute pure-wave (or single-mode) absorption parameters; in other words, a P-wave absorption parameter Q is computed based on a P-wave reflected from a subterranean structure in response to a source P-wave; and an S-wave absorption parameter Q is estimated from an S-wave reflected from a subterranean structure in response to a source S-wave. Techniques for surveying subterranean structures based on estimating pure wave absorption Qs suffer from reduced accuracy, since the surveying does not take into account all available data.

SUMMARY

In general, according to an embodiment, a method of surveying a subterranean structure includes processing measured seismic data using an algorithm for deriving a single-mode absorption parameter, and computing an absorption parameter for a mode-converted seismic wave based on an output of the algorithm, where the mode-converted seismic wave is reflected from the subterranean structure in response to a source seismic wave of a different mode then the mode-converted seismic wave.

Other or alternative features will become apparent from the following description, from the drawings, and from the claims.

DETAILED DESCRIPTION

A seismic surveying technique according to some embodiments is able to estimate an absorption parameter for a mode-converted seismic wave based on output of a tool that applies an algorithm for deriving a single-mode (pure wave) absorption parameter. The absorption parameter (e.g., absorption Q) represents the absorption (or dissipation) effect experienced by a seismic wave traveling through a subterranean structure. An absorption Q is also referred to as anelastic attenuation or seismic quality factor. Note that the term "absorption parameter" can alternatively refer to an R parameter, which is equal to travel time divided by absorption Q. The R parameter is discussed further below.

Seismic waves have two modes: a compression mode in which the seismic wave includes a P-wave or compression wave that extends in the direction of propagation of the seismic wave; and a shear mode in which the seismic wave is an S-wave or shear wave that extends in a direction generally perpendicular to the direction of propagation of the seismic wave. A source seismic wave produced by a seismic source (e.g., an explosive, an air gun, etc.) is directed into a subterranean structure, which can have a subsurface reflector (e.g., an interface to a layer of hydrocarbons, a layer of water, or another layer of interest). The seismic wave is reflected from the subsurface reflector, where the reflected seismic wave can be measured by a seismic sensor (or plural seismic sensors) (e.g., geophones or other seismic sensors). In many cases, mode conversion can occur upon reflection from the subsurface reflector. For example, a source P-wave can be reflected as an S-wave, or alternatively, a source S-wave can be reflected as a P-wave. A reflected seismic wave that has a mode different than the mode of the source seismic wave is referred to as a mode-converted seismic wave.

Thus, a reflected S-wave produced from reflection of a source P-wave is one example of a mode-converted seismic wave. Similarly, a reflected P-wave produced from reflection of a source S-wave is another example of a mode-converted seismic wave. Often, a seismic wave reflected from a subterranean structure includes both P-waves and S-waves. The mode-converted wave is the one of the reflected P-waves and S-waves having a different mode from the source seismic wave.

As noted above, a seismic surveying technique according to some embodiments estimates absorption parameters for mode-converted seismic waves, which allows the seismic surveying technique to take into account absorption effects associated with mode-converted seismic waves. Considering absorption effects of reflected mode-converted seismic waves, as well as absorption effects of reflected pure (or single-mode) seismic waves, allows the seismic surveying technique to be more accurate than conventional surveying techniques (which typically just compute pure wave absorption parameters).

The surveying technique according to some embodiments can be applied to marine seismic surveying, land seismic surveying, seabed seismic surveying, and borehole (wellbore) seismic surveying. With land seismic surveying, seismic sources and seismic sensors are placed at the earth surface to survey the subterranean structure underneath the earth surface. With seabed seismic surveying, seismic sources and seismic sensors are placed on the sea floor to survey a subterranean structure underneath the sea floor. With borehole surveying, seismic sensors and/or sources are placed in the borehole to survey a subterranean structure behind the wall of the borehole.

Figure 1:
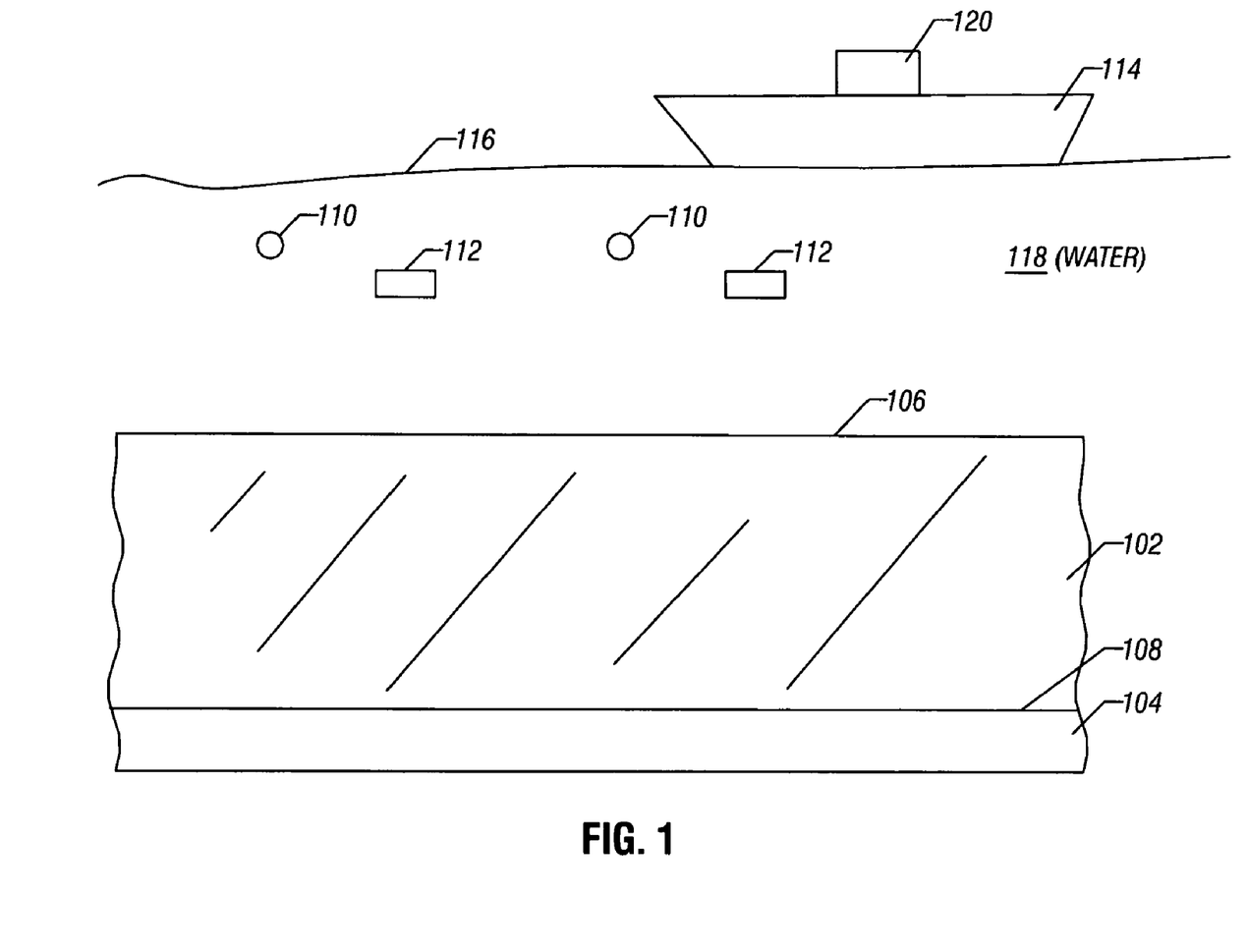
FIG. 1 is a schematic view of marine seismic surveying arrangement in which some embodiments of the invention can be employed.

FIG. 1 illustrates an example marine seismic surveying environment. In FIG. 1, the subterranean structure includes subterranean layers 102 and 104 underneath a sea floor (or seabed) 106. In some examples, the subterranean layer 102 can include an earth formation, while the subterranean layer 104 can include a hydrocarbon layer, a water layer, or some other layer of interest. An interface 108 between the subterranean layers 102, 104 is a subsurface reflector that reflects seismic waves.

FIG. 1 also shows a number of seismic sources 110 and seismic sensors 112 in the body of water 118. The seismic sources 110 and seismic sensors 112 can be towed by a sea vessel 114 at the sea surface 116. For example, the seismic sources 110 and seismic sensors 112 can be attached to support cables (not shown) that are connected to the sea vessel 114. A seismic source 110 creates seismic waves in the body of water 118, and a portion of the seismic waves travels downwardly through the body of water 118 and into the subterranean layer 102. Some portion of the seismic waves is reflected upwardly by the interface 108 between the subterranean layers 102, 104. The reflected seismic waves can be received by the seismic sensors 112, which produce measured seismic data to be processed. The measured seismic data can be in the form of a seismogram, a seismic trace, or in some other format.

If a computer 120 is provided on the sea vessel 114, then the computer 120 can be used to process the seismic data produced by the seismic sensors 112. Alternatively, the data recorded by the seismic sensors 112 can be processed later when the sea vessel 114 returns to land. In yet another alternative, the sea vessel 114 can communicate (such as by wireless communication) the measured seismic data to a remote computer for processing at the remote computer.

In other implementations, the seismic sources 110 and seismic sensors 112 can be located on the sea floor 106, instead of being towed by the sea vessel 114. In a land surveying context, the seismic sources 110 and seismic sensors 112 are provided on the earth surface. In a borehole surveying context, the seismic sources 110 and/or seismic sensors 112 are positioned in the borehole.

As noted above, a reflected seismic wave can be a mode-converted seismic wave that has a different mode then the source seismic wave. For example, in FIG. 2A, a seismic source 110 produces a source P-wave that is reflected from a subsurface reflector 200 (e.g., interface 108 in FIG. 1) as a reflected S-wave (mode-converted seismic wave), where the reflected S-wave is detected by a seismic sensor 112. This is contrasted to the scenario of FIG. 2B, where a source P-wave generated by the seismic source 110 is reflected by the seismic reflector 200 as a reflected P-wave.

Figure 3A:
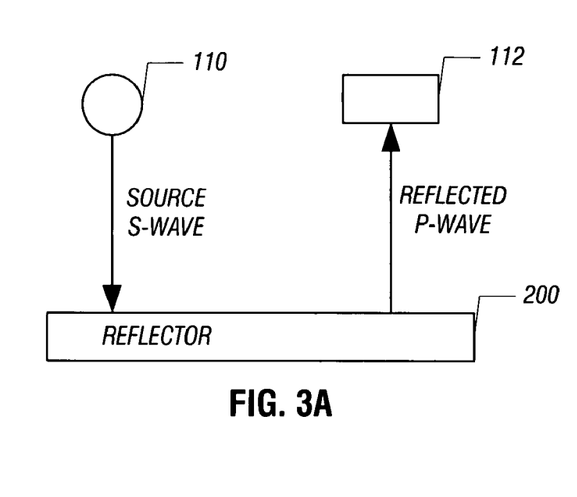

Similarly, as depicted in FIG. 3A, a source S-wave produced by a seismic source 110 can be reflected by the subsurface reflector 200 as a reflected P-wave (mode-converted seismic wave) that is detected by the seismic sensor 112. On the other hand, FIG. 3B shows a reflected S-wave reflected from the subsurface reflector 200 in response to a source S-wave.

Figure 2A:
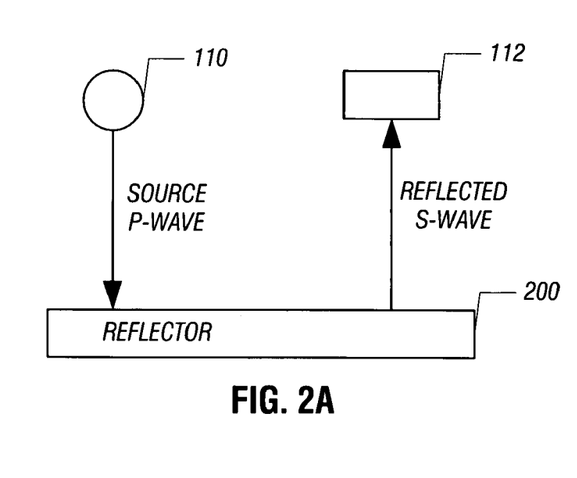
FIGS. 2A-2B and 3A-3B illustrate examples of single-mode seismic waves and mode-converted seismic waves.
Figure 2B:
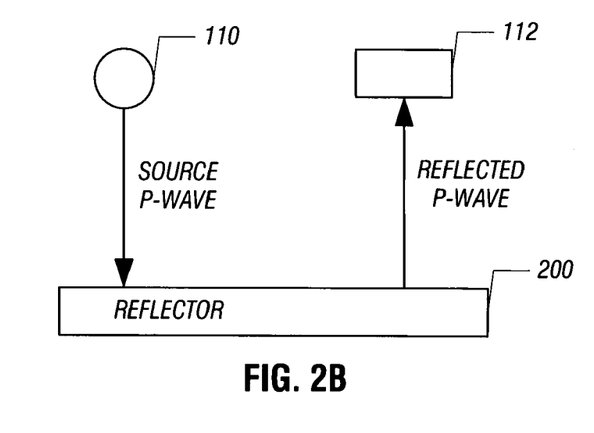
Figure 3B:
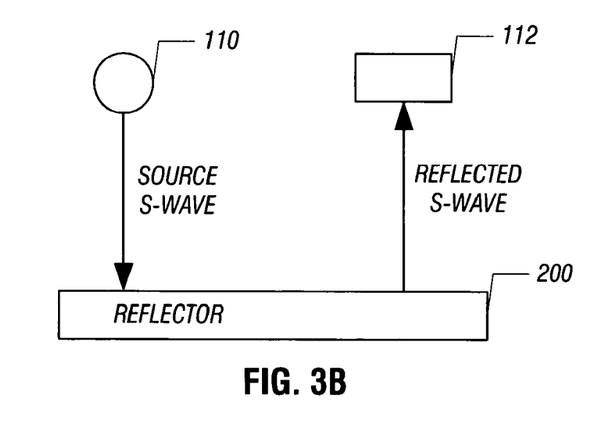

FIGS. 2B and 3B are examples of single-mode scenarios, since the reflected wave in each case has the same mode as the source wave. On the other hand, FIGS. 2A and 3A are examples of mode-converted (or mixed) scenarios, since the reflected wave in each case has a different mode than the source wave.

Both the source seismic wave and the reflected seismic wave are subject to absorption (dissipation) effects caused by transformation of the energy of the seismic waves to heat by subterranean formation(s) through which the seismic waves propagate. Each of the source and reflected seismic waves is associated with a respective absorption parameter (e.g., absorption Q).

Eq. 1 below defines an amplitude function $A_R(f)$ of a seismic wave, where the amplitude function is dependent upon both frequency (f) and R (which depends upon Q(t)).

$$A_R(f) = \exp(\text{sgn } \eta f R), \quad \text{(Eq. 1)}$$

$$R = \frac{t}{Q(t)}. \quad \text{(Eq. 2)}$$

Q(t) represents the absorption Q that is a function of travel time of the seismic wave. The value t is the total travel time in both directions (the travel time of the source seismic wave to the subsurface reflector 200, plus the travel time of the reflected seismic wave from the reflector to the seismic sensor). The parameter R is calculated according to Eq. 2 above, with R being a value equal to t (total travel time) divided by Q(t). It is noted that the term "absorption parameter" refers to either the absorption Q, represented by Q(t), or R. The amplitude transfer function defines how the absorption effects of the subterranean structure reduce amplitudes of seismic waves at different frequencies f.

The phase function of the seismic data is as expressed as follows:

$$\varphi_R(f) = \text{sgn} 2f \ln\left(\frac{f_c}{f}\right) R. \quad \text{(Eq. 3)}$$

The phase function defines how the absorption effects of the subterranean structure changes the phase of the seismic wave. In both Eqs. 1 and 3 above, the value of "sgn" varies depending upon the application of the amplitude function $A_R(f)$ and the phase function $\Phi_R(f)$. The value of "sgn" is −1 if the amplitude and phase functions are used for absorption simulation (to simulate the absorption effects of a subterranean structure on the source and reflected seismic waves). On the other hand, the value of "sgn" is equal to +1 when the amplitude and phase functions are used for correction of measured seismic data (i.e., when $A_R(f)$ and $\Phi_R(f)$ are used as inverse filters to be applied to the measured seismic data to compensate for absorption effects).

Once Q(t) is known, then R can be derived according to Eq. 2, and from R, the transfer and phase functions can be implemented as respective compensation filters (inverse filters) to be applied to measured seismic data to compensate for absorption effects, where the absorption effects are represented by Q(t) or R. Note that according to Eq. 1, absorption increases (amplitude decreases) with both frequency and two-way travel time. Similarly, as indicated by Eq. 3, phase velocity increases with frequency up to an upper cut-off frequency $f_c$, and is constant thereafter.

Eqs. 1 and 3 above express amplitude and phase functions in the single-mode scenario (where absorption Q is the same in both the direction of propagation of a source seismic wave and a direction of propagation of the reflected seismic wave). However, in the mixed or mode-converted scenario, as depicted in FIGS. 2A and 3A, the equations have to be modified somewhat to account for the fact that the absorption Q for the mode-converted seismic wave is different from the absorption Q for the source seismic wave. However, it is noted that mode-converted absorption follows identical mathematical rules as single-mode absorption. The absorption effects for the source seismic wave and the reflected mode-converted seismic wave are cumulative; in other words, the absorption effect for the source seismic wave traveling from the surface to the subsurface reflector, and the absorption effect of the reflected seismic wave traveling back from the subsurface reflector to the surface, are cumulative, in the sense that the overall absorption can be described by the multiplication of both the amplitude transfer function associated with the source seismic wave and the amplitude transfer function for the reflected, mode-converted seismic wave.

For example, assuming the source seismic wave is a P-wave, and the reflected, mode-converted seismic wave is an S-wave, then the amplitude function in this mixed scenario is represented as follows:

$$A(f) = \exp\left(\text{sgn}\pi f \frac{R_P(2t_P)}{2}\right)\exp\left(\text{sgn}\pi f \frac{R_S(2t_S)}{2}\right) = \exp(\text{sgn}\pi f R_{ps}(t_{PS})), \quad \text{(Eq. 4)}$$

where $$R_{PS}(t_{PS}) = \frac{R_P(2t_P) + R_S(2t_S)}{2}, \quad \text{(Eq. 5)}$$

and $$t_{PS} = t_P + t_S. \quad \text{(Eq. 6)}$$

Eq. 4 replaces R in Eq. 1 with $R_{PS}$, where $R_{PS}$ represents the mode-converted absorption parameter R. Eq. 5 indicates that $R_{PS}$ is made up of the average of $R_P$ and $R_S$. Eq. 5 provides the link between the effective mode-converted absorption parameter $R_{PS}$ (based on the total travel time of the P-wave and the S-wave) and the P-wave $R_P$ and S-wave $R_S$ as functions of two-way travel times ($2t_P$ and $2t_S$). The total travel time $t_{PS}$ is the sum of the travel time ($t_P$) of the source P-wave, and the travel time ($t_S$) of the mode-converted S-wave, as expressed in Eq. 6 above.

Eqs. 4-6 thus describe the absorption effects for a seismic wave traveling down to the subsurface reflector as a P-wave for a one-way travel time $t_P$, undergoing one-way absorption described in terms of the ratio of the two-way P-wave travel time $2t_P$ and Q for P-waves (represented by $Q_P(2t_P)$), and traveling upwardly to the seismic sensor for a certain one-way travel time $t_S$, undergoing one-way absorption described in terms of the ratio of the two-way S-wave travel time ($2t_S$) and the Q for S-waves (represented by $Q_S(2t_S)$). It is noted that $$R_P(2t_P) = \frac{2t_P}{Q(2t_P)}, \text{ and } R_S(2t_S) = \frac{2t_S}{Q(2t_S)}.$$

Note also that the functions $R_P$ and $R_S$ together describe two-way absorption.

The phase function for the mixed scenario can be similarly derived such that $$\varphi(f) = \text{sgn}2f\ln\left(\frac{f_c}{f}\right)R_{PS}(2t_{PS}), \quad \text{(Eq. 7)}$$

where Eq. 7 differs from Eq. 3 in that R in Eq. 3 has been replaced with $R_{ps}$ in Eq. 7. (In the reverse scenario where the source seismic wave is an S-wave, and the reflected mode-converted seismic wave is a P-wave, then the parameters above are replaced as follows: $R_{PS} \to R_{SP}$, and $t_{PS} \to t_{SP}$).

From the foregoing, it can be seen that the amplitude and phase functions for the mode-converted scenario can be readily derived once the absorption parameter $R_{PS}$ is derived. As described above, mode-converted absorption follows identical mathematical rules as single-mode absorption. Therefore, in accordance with some embodiments, $R_{PS}$ can be derived from measured seismic data (e.g., seismogram, seismic trace, etc.) for the mode-converted seismic wave using single-mode absorption parameter estimation techniques.

Figure 4:
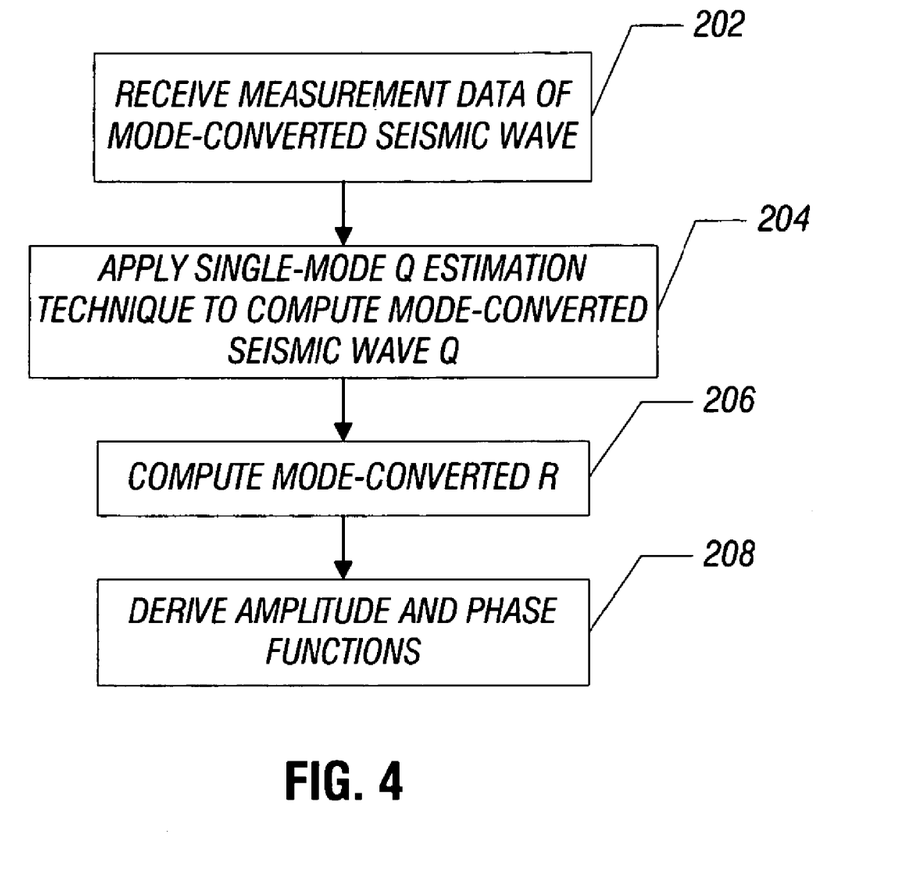
FIG. 4 is a flow diagram of a process of computing an absorption parameter using a technique according to an embodiment of the invention.

FIG. 4 shows a process of characterizing absorption effects in a mixed scenario (mode converted scenario). First, measurement data of the mode-converted seismic wave is received (at 202). Next, the absorption Q for the mode-converted seismic wave is estimated (at 204), using a single-mode (or pure wave) Q estimation technique. There are various known single-mode Q estimation techniques, including those described in WO 2006/025824, entitled "Method for Estimating Absorption Parameter Q(T)," published Mar. 9, 2006, by Ralf Ferber. In other implementations, other single-mode Q estimation techniques can be employed.

The mode-converted absorption Q estimated at 204 is represented as $Q_{PS}$ (for the case where the source seismic wave is a P-wave, and the reflected seismic wave is an S-wave). From $Q_{PS}$, the mode-converted absorption parameter $R_{PS}$ can be computed (at 206) as follows:

$$R_{PS}(t_{PS}) = \frac{t_{PS}}{Q(t_{PS})}.$$

Once $R_{PS}(t_{PS})$ is known, the amplitude and phase functions for the mode converted scenario can be derived (at 208), according to Eqs. 4 and 7 above. As noted above, the amplitude and phase functions can be used to perform either simulation to characterize absorption effects of a subterranean structure, or to build inverse filters to correct measured seismic data to compensate for absorption effects.

Figure 5:
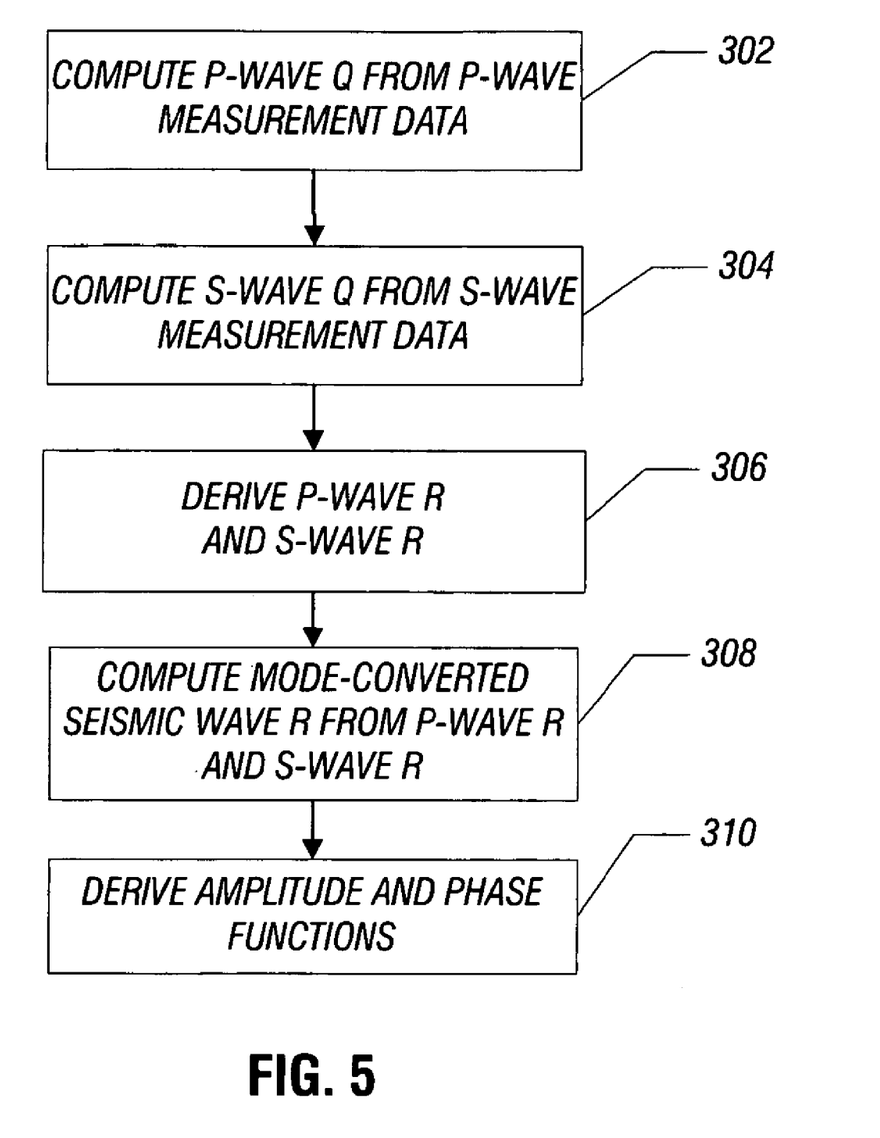
FIG. 5 is a flow diagram of a process of computing an estimated absorption parameter in accordance with another embodiment of the invention.

FIG. 5 shows another technique of characterizing absorption effects in a mode-converted scenario, according to an alternative embodiment. In this alternative embodiment, the mode-converted seismic wave Q is estimated from the P-wave Q and the S-wave Q (from which the P-wave R and S-wave R can be readily derived according to Eq. 2). Thus, according to the FIG. 5 embodiment, the P-wave Q is computed (at 302) from P-wave measurement data, and the S-wave Q is computed (at 304) from the S-wave measurement data. Note that both the P-wave Q and the S-wave Q are single-mode absorption Qs, which are both estimated using single-mode Q estimation techniques, such as those described in WO 2006/025824.

From the P-wave Q and the S-wave Q, the values of $R_P$ and $R_S$ can be respectively derived (at 306). Assume further that the travel time $t_{PS}$ is available for the mode-converted seismic wave. From the above-data, the mode-converted wave absorption parameter $R_{PS}$ is computed (at 308) from the P-wave and S-wave absorption parameters $R_P$ and $R_S$ according to Eq. 5 above.

Note, however, that Eq. 5 requires that the one-way travel times, $t_P$ and $t_S$ have to be computed. To compute the one-way travel times, $t_P$ and $t_S$, from the two-way travel time $t_{PS}$, the average P-wave and the S-wave two-way travel time velocity functions $V_P(t)$ and $V_S(t)$ are needed. The one-way P-wave travel time can be determined by solving the following equation for $t_P$:

$$\frac{t_P}{V_P(2t_P)} - \frac{t_{PS} - t_P}{V_S(2(t_{PS} - t_P))} = 0. \quad \text{(Eq. 8)}$$

Eq. 8 above has just the P-wave one-way travel time $t_P$ as an unknown, and can be solved by a line search algorithm or some other technique. Once $t_P$ is known, the S-wave travel time $t_S$ can be readily derived according to Eq. 9 below:

$$t_S = t_{PS} - t_P. \quad \text{(Eq. 9)}$$

Both one-way travels times $t_P$ and $t_S$ are then used to compute $R_{PS}(t_{PS})$ using Eq. 5. Having computed $R_{PS}(t_{PS})$, the mode-converted seismic wave Q function can be derived as follows:

$$Q_{PS}(t) = \frac{t_{PS}}{R_{PS}(t_{PS})}. \quad \text{(Eq. 10)}$$

In addition, as with the technique of FIG. 4, the amplitude and phase functions can be derived (at 310) once $R_{PS}$ is known.

More generally, with either of the FIG. 4 or FIG. 5 technique, measured seismic data is processed using an algorithm for deriving a single-mode absorption parameter. In the FIG. 4 technique, the measured seismic data processed is the measured mode-converted seismic data. In the FIG. 5 technique, the measured seismic data processed is the measured single-mode P-wave data and S-wave data. Based on an output of the algorithm for deriving a single-mode absorption parameter, an absorption parameter for a mode-converted seismic wave is computed, wherein the mode-converted absorption parameter represents an absorption effect of the mode-converted seismic wave by the subterranean structure.

Figure 6:
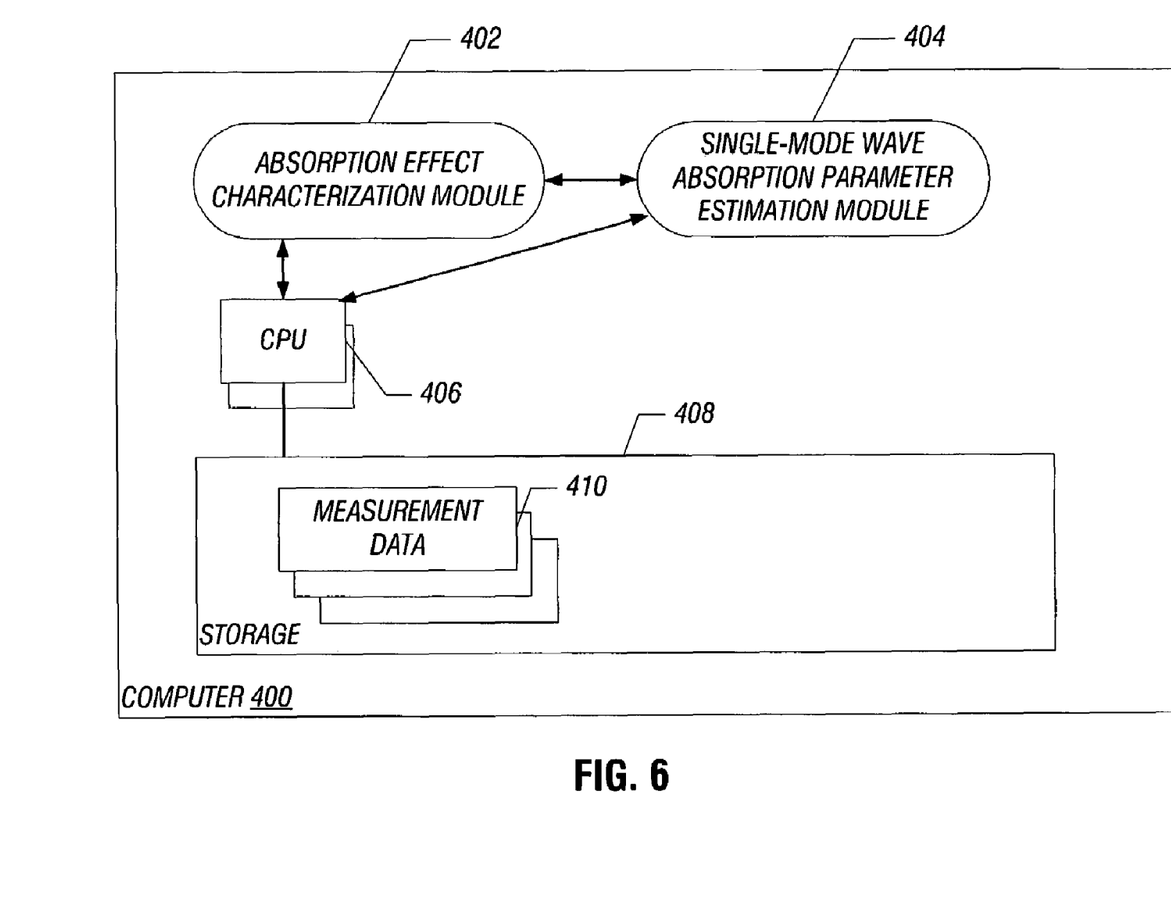
FIG. 6 is a block diagram of an arrangement including a computer in which some embodiments of the invention may be implemented.

FIG. 6 shows an example of computer 400 in which an absorption effect characterization module 402 according to some embodiments can be executed. The absorption effect characterization module 402 can perform the tasks represented by either FIG. 4 or 5. The absorption effect characterization module 402 is able to invoke a single-mode wave absorption parameter estimation module 404 to compute desired values, as discussed above. Both modules 402 and 404, which can be implemented in software, are executed on one or more central processing units (CPUs) 406, which are connected to a storage 408 (e.g., volatile memory or persistent storage). The storage 408 can store measurement data 410, such as seismic measurement data.

Data and instructions (of the software modules discussed above) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method of surveying a subterranean structure, comprising:
    processing measured seismic data using an algorithm for deriving a single-mode absorption parameter; and
    computing a first absorption parameter for a mode-converted seismic wave based on an output of the algorithm, wherein the first absorption parameter represents an absorption effect of the mode-converted seismic wave by the subterranean structure, and wherein the mode-converted seismic wave is reflected from the subterranean structure in response to a source seismic wave of a different mode than the mode-converted seismic wave.

2. The method of claim 1, wherein processing the measured seismic data comprises processing the measured seismic data for a mode-converted seismic wave.

3. The method of claim 2, wherein computing the first absorption parameter comprises computing a mode-converted absorption Q that is based on a cumulative effect of a first absorption Q for the source seismic wave traveling from a seismic source to a subsurface reflector in the subterranean structure, and a second absorption Q for the mode-converted seismic wave traveling from the subsurface reflector to a seismic sensor.

4. The method of claim 3, further comprising computing an R parameter that is equal to a total travel time divided by the mode-converted absorption Q, wherein the total travel time is equal to a sum of a travel time of the source seismic wave from the seismic source to the subsurface reflector, and a travel time of the mode converted seismic wave from the subsurface reflector to the seismic sensor.

5. The method of claim 4, further comprising deriving an amplitude transfer function to represent amplitude dissipation caused by the absorption effect, wherein the amplitude transfer function is based on the R parameter.

6. The method of claim 1, wherein processing the measured seismic data comprises processing measured seismic data for a single-mode P-wave to produce a first absorption Q for the single-mode P-wave, the method further comprising processing further measured seismic data for a single-mode S-wave to produce a second absorption Q for the single-mode S-wave.

7. The method of claim 6, further comprising:
determining a first travel time of the source seismic wave from a seismic source to a subsurface reflector in the subterranean structure; and
determining a second travel time of the mode-converted seismic wave from the subsurface reflector to a seismic sensor.

8. The method of claim 7, further comprising computing an $R_P$ parameter as a function of two times the first travel time based on the absorption Q for the single-mode P-wave, and computing an $R_S$ parameter as a function of two times the second travel time based on the absorption Q for the single-mode S-wave.

9. The method of claim 8, further comprising:
averaging the $R_P$ and $R_S$ parameters to obtain an average R; and
deriving an amplitude transfer function based on the average R, wherein the amplitude transfer function represents amplitude dissipation caused by the absorption effect.

10. The method of claim 7, wherein determining the first and second travel times are based on: (1) a total travel time of the source seismic wave and the mode-converted seismic wave; and (2) velocity functions of the P-wave and the S-wave.

11. An article comprising at least one storage medium containing instructions that when executed cause a computer to:
receive measured data provided by at least one seismic sensor, the measured data relating to a mode-converted seismic wave reflected from the subterranean structure, the mode-converted seismic wave having a mode different from a mode of a source seismic wave produced by a seismic source; and
apply an algorithm for deriving a single-mode absorption parameter to compute an absorption parameter for the mode-converted seismic wave based on the received measured data.

12. The article of claim 11, wherein receiving the measured data comprises receiving S-wave data that is reflected from the subterranean structure in response to a source P-wave.

13. The article of claim 11, wherein receiving the measured data comprises receiving P-wave data that is reflected from the subterranean structure in response to a source S-wave.

14. The article of claim 11, wherein computing the absorption parameter comprises computing an overall absorption Q that represents a cumulative effect of a first absorption Q for the source seismic wave and a second absorption Q for the mode-converted seismic wave.

15. The article of claim 14, wherein the instructions when executed cause the computer to further compute an R parameter that is equal to total travel time of the source seismic wave and the mode-converted seismic wave divided by the overall absorption Q.

16. The article of claim 15, wherein the instructions when executed cause the computer to further derive an amplitude transfer function based on the R parameter, wherein the amplitude transfer function is to be used in at least one of simulating an absorption effect of the subterranean structure, and compensating for the absorption effect of the subterranean structure.

17. A computer comprising:
at least central processing unit (CPU); and
software executable on the at least one CPU to:
process measured seismic data using an algorithm for deriving a single-mode absorption parameter; and
compute a first absorption parameter for a mode-converted seismic wave based on an output of the algorithm, wherein the first absorption parameter represents an absorption effect of the mode-converted seismic wave by the subterranean structure, and wherein the mode-converted seismic wave is reflected from the subterranean structure in response to a source seismic wave of a different mode than the mode-converted seismic wave.

* * * * *